United States Patent [19]

Martl et al.

[11] Patent Number: 5,789,528
[45] Date of Patent: Aug. 4, 1998

[54] PROCESS FOR THE PREPARATION OF POLYESTERS AND COPOLYESTERS

[75] Inventors: Michael Martl, Obernburg; Thomas Mezger, Erlenbach; Bernard Kuhn, Fischbachtal; Gerriet Oberlein, Velbert; Klaus Haferland; Bertram Boehringer, both of Wuppertal; Ulrich Berger, Heinsberg, all of Germany

[73] Assignee: Akzo Nobel NV, Arnhem, Netherlands

[21] Appl. No.: 816,238

[22] Filed: Mar. 13, 1997

Related U.S. Application Data

[63] Continuation-in-part of Ser. No. 771,746, Dec. 20, 1996, which is a continuation-in-part of Ser. No. 569,630, Dec. 8, 1995, abandoned.

[51] Int. Cl.⁶ ............................................. C08G 63/78
[52] U.S. Cl. ..................... 528/279; 528/286; 528/297; 528/298; 528/300; 528/302; 528/307; 528/308; 528/308.6
[58] Field of Search ........................... 528/279, 286, 528/297, 298, 300, 302, 307, 308, 308.6

[56] References Cited

U.S. PATENT DOCUMENTS

| | | | |
|---|---|---|---|
| 3,817,935 | 6/1974 | Beer | 260/75 R |
| 4,208,527 | 6/1980 | Horlbeck et al. | 528/279 |
| 4,421,908 | 12/1983 | East | 528/181 |

FOREIGN PATENT DOCUMENTS

| | | |
|---|---|---|
| 422896 | 4/1991 | European Pat. Off. . |
| 472179 | 2/1992 | European Pat. Off. . |
| 43-13233 | 6/1968 | Japan . |
| 45-33671 | 10/1970 | Japan . |
| 46-25869 | 7/1971 | Japan . |
| 52-36189 | 3/1977 | Japan . |

*Primary Examiner*—Samuel A. Acquah
*Attorney, Agent, or Firm*—Richard P. Fennelly; Louis A. Morris

[57] ABSTRACT

The preparation of polyesters and copolyesters, titanium dioxide precipitates and/or titanium dioxide/silicon dioxide coprecipitates having a composition of $TiO_2:SiO_2>90:10$ mol/mol and/or titanium dioxide/zirconium dioxide coprecipitates having a composition of $TiO_2:ZrO_2>95:5$ mol/mol, which have been obtained by hydrolytic precipitation of the corresponding metal alcoholates formed from mono- or polyhydric alcohols, are proposed as polycondensation catalysts. They offer increased safety for the ecosystem and have a higher catalytic activity than $Sb_2O_3$, so that the preferred amount used is only 10 to 100 ppm, based on the esters or oligoesters to be subjected to polycondensation. Their storage stability is good if the catalysts have a water content of from 0 to about 15 weight percent, preferably from 0 to about 5 weight percent based upon the hydrated precipitate or coprecipitate, as determined by Karl Fischer titration.

15 Claims, No Drawings

PROCESS FOR THE PREPARATION OF POLYESTERS AND COPOLYESTERS

CROSS REFERENCE TO RELATED APPLICATIONS

This application is a continuation-in-part of U.S. Ser. No. 08/771,746, filed Dec. 20, 1996, which is a continuation-in-part of U.S. Ser. No. 08/569,630, filed Dec. 8, 1995, abandoned which application, in turn, claims the benefit of the filing date of prior German Patent Application No. P 44 43 648.3, filed Dec. 08, 1994, which is incorporated herein by reference in its entirety.

BACKGROUND OF THE INVENTION

1. Field of the Invention

The present invention relates to a process for the preparation of polyesters and copolyesters and the use of polycondensation catalysts.

2. Description of the Related Art

Polyesters and copolyesters are in general prepared by a two-stage process, regardless of their structure, which can extend from aliphatic to completely aromatic via numerous possible variations. In the first stage, in particular, dicarboxylic acid esters are transesterified or dicarboxylic acids are esterified with excess dialcohols to prepare the esters to be subjected to polycondensation or a polyester precondensate which comprises a mixture of oligoesters and can have an average relative molecular weight, depending on the molar ratio of the starting compounds, of as a rule between 100 and 2000. Limited amounts of starting components of higher functionality, such as glycerol, pentaerythritol and trimellitic acid, can also be employed for any desired branching modification. Equivalent procedures for the first stage are the reaction of dicarboxylic acid chlorides with diols, the addition of ethylene oxide onto dicarboxylic acids, the esterification of an anhydride with a dialcohol, the reaction of anhydrides with epoxides and the reaction of dicarboxylic acids or dicarboxylic acid esters with the diacetate of a diol. The second reaction stage is the actual polycondensation, in which the desired high molecular weight of the polyesters or copolyesters must be achieved, alcohol and/or water being split off. As well as applying vacuum, passing through an inert gas and increasing the reaction temperature, the polycondensation is accelerated, in particular, by specific polycondensation catalysts.

A legion of polycondensation catalysts for acceleration of the polycondensation reaction has already been proposed for the preparation of film- and fiber-forming polyesters. Since the overwhelming majority of compounds mentioned in numerous patents have an inadequate catalytic activity or other disadvantages, almost exclusively $Sb_2O_3$ has become accepted as the polycondensation catalyst in the art. Unfortunately, this catalyst has recently met objections in terms of environmental policy, so that its replacement generally seems desirable.

Attempts are continuously being made to provide substitute catalysts for $Sb_2O_3$. In particular, alkoxy titanates, specifically tetrabutyl titanate, have already been proposed, these compounds being used either only for the transesterification (JA Patent 7411474), for the transesterification and polycondensation (JA-A 7786496) or only for the polycondensation (JA-A 8023136), since they are catalytically active for both stages. Since the use of titanium compounds causes discolorations in the polycondensed polyesters, according to JA-A 78106792, it is necessary to pretreat titanium compounds with various organic substances, for example amines, or to combine them with other polycondensation catalysts, in particular with $Sb_2O_3$ (JA-A 78109597).

It is known from DEP 947517 to employ metal oxides, such as zinc oxide, boron trioxide, lead oxide and titanium oxide, as polycondensation catalysts for the preparation of polyethylene terephthalate. However, the polycondensation time with these metal oxides is disproportionately long and, from the examples therein, lasts 7–14 hours. For this reason, in BEP 619210, $Sb_2O_3$ is used as a further polycondensation catalyst when $TiO_2$ is used for preparation of the polyesters therein (cf. Example 1), as a result of which the speed of the polycondensation increases immensely. These circumstances of course resulted in the expediency of using only $Sb_2O_3$ or titanium tetrabutylate as the polycondensation catalyst (cf. the other examples of BE P 619210).

SUMMARY OF THE INVENTION

In accordance with one aspect of the present invention there is provided a method for the general synthesis of polyesters and copolyesters, new polycondensation catalysts as a replacement for $Sb_2O_3$ which offer increased safety for the ecosystem and are distinguished in particular by a higher catalytic activity than that of $Sb_2O_3$, $TiO_2$ and titanium tetrabutylate each in the same concentration. These new polycondensation catalysts also have good storage stability, that is, they do not lose their catalytic activity during storage which is one of the most important prerequisites for such catalysts in regard to their use in the manufacture of polyesters.

This and other aspects of the present invention will become apparent upon a review of the following detailed description and the claims appended thereto.

DETAILED DESCRIPTION OF PREFERRED EMBODIMENTS

The present invention relates to a process for the preparation of polyesters and copolyesters by polycondensation of polyester-forming starting components, esters or oligoesters being prepared in a first reaction stage and subjected to polycondensation in a second reaction stage in the presence of titanium catalysts, which is characterized in that, in the polycondensation stage, a titanium dioxide precipitate and/or a titanium dioxide/silicon dioxide coprecipitate having a composition of $TiO_2:SiO_2$ of >90:10 mol/mol and/or a titanium dioxide/zirconium dioxide coprecipitate having a composition of $TiO_2: ZrO_2$ of >95:5 mol/mol, which have been obtained by hydrolytic precipitation of the corresponding metal alcoholates formed from mono- or polyhydric alcohols, is employed as the polycondensation catalyst for polycondensation of the esters or oligoesters. In general, the precipitates and coprecipitates according to the invention have a water content of from 0 to about 15 weight percent based upon the hydrated precipitate or coprecipitate, as determined by Karl Fischer titration. Preferably, they have a water content of from 0 to about 5 weight percent. If the water content is higher, than 15 weight percent, the storage stability is lowered because the catalysts have a considerably reduced activity after storage.

On the basis of the fact that $TiO_2$ is a poor polycondensation catalyst for the synthesis of polyesters (cf. Comparison Examples 1a and 1b), it is surprising that the titanium dioxide precipitates, titanium dioxide/silicon dioxide coprecipitates and titanium dioxide/zirconium dioxide coprecipitates employed according to claim 1 are highly active polycondensation catalysts at all, in particular for the preparation of thread-forming high molecular weight polyesters and copolyesters, and moreover even in the very small amounts preferably used.

For the use according to the invention as a polycondensation catalyst, it is preferable for the titanium dioxide precipitates, titanium dioxide/silicon dioxide coprecipitates and titanium dioxide/zirconium dioxide coprecipitates to have been obtained by hydrolytic precipitation of the corresponding metal alcoholates formed from monohydric alcohols having 1–6C atoms. A titanium dioxide precipitate or a titanium dioxide/silicon dioxide coprecipitate from the required composition range, like a corresponding titanium dioxide/zirconium dioxide coprecipitate, can be employed as the polycondensation catalyst by itself or as a mixture with the other particular type of precipitate or, in the case of the coprecipitates mentioned, as a mixture with its own type having a different composition within the required composition ranges.

The preparation of the titanium dioxide precipitates and titanium dioxide/silicon dioxide and titanium dioxide/zirconium dioxide coprecipitates used according to the invention is known in principle (cf., for example, B. E. Yoldes, J. Non-Cryst. Solids, 38 and 39, 81 (1980); E. A. Barringer, H. K. Bowen, J. Am. Ceram. Soc., 65 C 199 (1982); E. A. Barringer, Ph.D. Thesis, MIT (1982); B. Fegley jr., E. A. Barringer, H. K. Bowen, J. Am. Ceram. Soc., 67, C 113 (1984)). The starting substances are metal alkoxides of the formula $M(OR)_m$, wherein M is Ti, Si and Zr, according to the desired oxide or mixed oxide, and m is the integer 4, which are subjected to hydrolysis. The oxide network is formed by polymerization reactions during this process.

Suitable alcohols for the preparation of the metal alkoxides by methods known per se are, for example, monohydric alcohols, such as methyl alcohol, ethyl alcohol, propyl alcohol, isopropyl alcohol, n-butanol, propyl alcohol, isobutyl alcohol, n-amyl alcohol, 3-methyl-1-butanol, n-hexanol, 2-hexanol, 2-heptanol, n-octanol and n-decanol, which can be used individually or as a mixture. However, it is also possible to use polyhydric alcohols, if appropriate as a mixture with monohydric alcohols, such as ethylene glycol, 1,2-propanediol, 1,4-butanediol, 1,6-hexanediol, 1,10-decanediol, glycerol, trimethylolpropane and pentaerythritol.

The organometallic compounds, in the case of preparation of a titanium dioxide precipitate, for example, titanium tetraisopropylate, are subjected to a hydrolysis which can be effected in various ways. Thus, for example, the titanium tetraalkoxide, dissolved in absolute alcohols, for example ethanol, can be hydrolyzed by means of addition of water or an aqueous alcohol within a period of about 20 minutes to 2 hours at 0° to 50° C. However, the hydrolysis can also be effected by adding water or an aqueous alcohol solution dropwise to the undissolved pure titanium tetraalkoxide under the conditions mentioned above. The water required for the hydrolysis, however, can also be contained in a gas phase as moisture, for example by passing damp nitrogen into the titanium tetraalkoxide at 0° to 50° C. for 3 to 30 hours. The as it were "in situ" formation of a dispersion of $TiO_2$ precipitate in glycol suitable for use in the reactor can also be advantageous. In this case, the undissolved pure titanium tetraalkoxides can be precipitated as $TiO_2$ precipitate under the above conditions by addition of glycol which contains the amount of water needed for the hydrolysis. If the glycol contains smaller amounts of water, the hydrolysis can additionally be carried out by passing, for example, damp nitrogen into the reaction vessel.

The preparation of the $TiO_2/SiO_2$ and $TiO_2/ZrO_2$ coprecipitates is carried out in an analogous manner, except that in each case two tetraalkoxides of titanium and silicon or of titanium and zirconium, of which the alkoxides otherwise can be identical or different, are in each case used for their precipitation. Advantageous forms of the preparation, at room temperature, of the precipitates and coprecipitates used according to the invention are described in the experimental part A in Examples 1 to 6. Under the hydrolytic conditions therein, gel formation, which is to be avoided, is excluded, and, during this precipitation of the $TiO_2$ and the Ti/Si and Ti/Zr mixed oxides takes place.

The amounts added of the precipitates and coprecipitates according to the invention which are used as the polycondensation catalyst can be varied within wide limits and include a total amount of about 5 to 500 ppm, based on the esters or oligoesters to be subjected to polycondensation. Their upper limit can therefore in principle be of the same order of magnitude as in the case where $Sb_2O_3$ is used, which is as a rule employed as a polycondensation catalyst in an amount of about 300 to 400 ppm.

If attention must be paid to achieving good color values for certain fields of use of the polyesters and copolyesters prepared, however, it is preferable to use the titanium dioxide precipitate and/or the titanium dioxide/silicon dioxide coprecipitate and/or the titanium dioxide/zirconium dioxide coprecipitate in a total amount of only 10 to 100 ppm, based on the esters or oligoesters to be subjected to polycondensation. The increased catalytic activity of the precipitates and coprecipitates used according to the invention allows the use of added amounts which are considerably lower than in the case where $Sb_2O_3$ is used, the same polycondensation time and a completely acceptable b* value of 3.0 to 8.0 then being achieved with the polyesters thus prepared. This b* value range corresponds in particular to the values which are likewise obtained in the preparation of polyethylene terephthalate using 400 ppm of $Sb_2O_3$ as the polycondensation catalyst. The titanium dioxide precipitates and titanium dioxide/silicon dioxide and titanium dioxide/zirconium dioxide coprecipitates used according to the invention are preferably added in the form of a 5 to 20% strength suspension in glycol to the esters or oligoesters synthesized in the first reaction stage, for example the bisglycol ester of the dicarboxylic acid(s) to be subjected to polycondensation and/or the precondensate of one or more such bisglycol esters, before their polycondensation. However, it is in principle also possible for the precipitates and coprecipitates even to be added at any point in time during the first reaction stage, and in the case of transesterification, if appropriate together with one or more transesterification catalysts. In the case of transesterification in the first reaction stage, it may sometimes be advantageous to block the transesterification catalysts after the transesterification by addition of phosphorus compounds in a manner known per se. Suitable phosphorus compounds are, for example, carbethoxymethyldiethyl phosphonate, di(polyoxyethylene)hydroxymethyl phosphonate, tetraisopropyl methylenediphosphonate and $H_3PO_4$, an added P concentration of 30–50 ppm in general being adequate.

Under customary reaction conditions, the precipitates and coprecipitates used according to the invention are in principle suitable as polycondensation catalysts for the preparation of the most diverse polyesters and copolyesters for which $Sb_2O_3$ has been employed to date as the polycondensation catalyst, if appropriate also in combination with one or more other polycondensation catalysts. The most diverse fields of use also correspond to the various types of polyesters and copolyesters.

If alkyd resins and saturated polyester resins (hydroxy-polyesters) having a relative molecular weight of <10,000 are prepared with the precipitates and coprecipitates used according to the invention, these can be used as binders in varnishes and paints. In modern usage, alkyd resins here are understood as meaning oil- or fatty acid-modified polyesters of polycarboxylic acids and polyalcohols and reaction products thereof with, for example, vinyl compounds, epoxy resins, silicones, diisocyanates and organometallic compounds ("modified" alkyd resins). Polycarboxylic acids which are employed for alkyd resins are essentially phthalic acid, isophthalic acid, malonic acid, succinic acid, adipic acid, azelaic acid, sebacic acid, dodecanedioic acid, dimerized fatty acids, hexahydrophthalic acid, hexahydroterephthalic acid, maleic acid, fumaric acid and, for the purpose of flameproofing, halogen-containing dicarboxylic acids, such as tetrachlorophthalic anhydride. Polyols which are used are in general glycerol, pentaerythritol, dipentaerythritol, trimethylolpropane, trimethylolethane, sorbitol and difunctional polyols, such as ethylene glycol, propylene 1,2-glycol, butane-1,3- and -1,4-diol, diethylene glycol, dipropylene glycol and neopentylglycol. The third component for the preparation of alkyd resins are long-chain fatty acids, either synthetic fatty acids, such as pelargonic acid, abietic acid and synthetic fatty acid mixtures ($C_7$–$C_9$), or naturally occurring fatty acids, which are used almost exclusively in the form of their fats and oils, for example linseed oil, castor oil, coconut oil, soya oil and cottonseed oil. In contrast, no longer-chain fatty acids are employed in the polycondensation for the preparation of saturated polyester resins, which are defined in DIN 55945, while otherwise the saturated polycarboxylic acids and polyalcohols used are essentially the same as those employed for the preparation of alkyd resins.

If (co)polyesters are synthesized as precursors for polyurethanes having a relative molecular weight of <10,000 using the precipitates and coprecipitates in question, this leads, depending on their further processing on the basis of known procedures, not only to polyurethane varnishes, but also to a diversity of different types of plastics having variable useful use properties (thermosets, thermoplastics, casting elastomers, rigid and flexible foams, compression molding compositions, rigid and flexible coatings, adhesives). The low molecular weight polyesters and copolyesters as precursors for polyurethanes are in general prepared from saturated aliphatic or aromatic dicarboxylic acids and difunctional or di- and trifunctional alcohols and are linear or slightly to severely branched. With the coprecipitates used according to the invention, it is possible to prepare the entire wide range of hydroxy-polyesters known for this, having hydroxyl numbers of 28–300 mg of KOH/g and acid numbers of usually less than 1 mg of KOH/g. The highly branched polyesters among them, which are chiefly obtained on the basis of aromatic or hydroaromatic dicarboxylic acids, are used mainly as binders for polyurethane varnishes.

The precipitates and coprecipitates used according to the invention are particularly suitable, under customary reaction conditions, as polycondensation catalysts for the preparation of the known high-melting fiber- and film-forming polyesters, such as polyethylene terephthalate, polybutylene terephthalate, poly(ethylene 2,6-naphthalenedicarboxylate), poly(butylene 2,6-naphthalenedicarboxylate), poly(1,4-dimethylenecyclohexane terephthalate) and copolyesters thereof based on high homopolyester contents of at least 80 mol per cent, which belong to the class of thermoplastic polyesters. Such polyesters and copolyesters in principle have a molecular weight of >10,000. The polyalkylene terephthalates preferably subjected to polycondensation with the coprecipitates, in particular polyethylene terephthalate and polybutylene terephthalate, can, as copolyesters, comprise up to 20 mol per cent of units which are derived from at least one other polyester-forming component. Furthermore, it is of course of no significance for the use of the polycondensation catalysts according to the invention whether the bisglycol esters of the dicarboxylic acid(s) to be subjected to polycondensation and/or the precondensates of one or more such bisglycol esters have been prepared by a transesterification process or by a direct esterification process.

The polycondensation catalysts according to the invention are thus suitable both for the preparation of a fiber-forming polyethylene terephthalate having an intrinsic viscosity [g] of 0.65–0.75, which as a rule is further processed to staple fibers for textile purposes, and for the preparation of fiber-forming polyethylene terephthalates having an intrinsic viscosity [g] of 0.75–0.80 and 0.95–1.05, from which filament yarns are prepared for industrial purposes. The increased molecular weights can be achieved by continuous polycondensation with direct spinning or, preferably, by post-condensation in the solid phase. For post-condensation in the solid phase, it is advantageous to block any transesterification catalysts present by phosphorus compounds in a manner known per se. Phosphorus compounds which are suitable for this are, for example, di(polyoxyethylene)-hydroxymethyl phosphonate, tetraisopropyl methylenediphosphonate and $H_3PO_4$, an added P concentration of 30–50 ppm being sufficient.

The fiber- and film-forming thermoplastic polyesters prepared with the polycondensation catalysts according to the invention, in particular polyethylene terephthalate and polybutylene terephthalate, can of course also be processed, for example, to all types of shaped articles and profiles by means of injection molding and extrusion. For example, if a polyethylene terephthalate prepared with the polycondensation catalysts according to the invention is processed to PET bottles, these have a high transparency and a lower acetaldehyde content.

The other polyester-forming components for fiber- and film-forming copolyesters can be an aliphatic diol, such as ethylene glycol, propylene glycol, tetramethylene glycol, pentamethylene glycol, hexamethylene glycol, polyethylene glycol, polypropylene glycol and poly(tetrahydrofuran)diol, an aromatic diol, such as pyrocatechol, resorcinol and hydroquinone, an alicyclic diol, such as 1,4-cyclohexanedimethanol and cyclohexanediol, an aliphatic dicarboxylic acid, such as adipic acid, sebacic acid and decanedicarboxylic acid, an aromatic dicarboxylic acid, such as isophthalic acid, 5-sodium-sulphoisophthalic acid, sodium-sulphoterephthalic acid and 2,6-naphthalenedicarboxylic acid, and an alicyclic dicarboxylic acid, such as hexahydroterephthalic acid and 1,3-cyclohexanedicarboxylic acid. The analogous polyester-forming components for copolyester formation are also possible for the thread-forming homopolyesters, some of which have already been mentioned above, which do not belong to the class of polyalkylene terephthalates.

The film- and fiber-forming polyesters can of course also comprise, as customary modifying agents, known branching agents, such as pentaerythritol, trimellitic acid, pyromellitic acid and trimesic acid or esters thereof, in the small amounts customary for this purpose of, for example, 1 to 15 microequivalents per g of polymer, these guaranteeing high-speed spinning at 3000 to 4000 m/min or more, and also drawtexturing at a rate of at least 1000 m/minute. These branching agents are advantageously added as a solution in ethylene glycol to the bisglycol ester of the dicarboxylic acid(s) to be subjected to polycondensation.

The term copolyester also includes the extensive class of polyether-esters. As is known, the thermoplastic polyether-esters are block copolymers which are synthesized from mutually incompatible rigid crystalline and flexible amorphous segments. The rigid and short-chain segments generally chiefly comprise an aromatic polyester, for example ethylene terephthalate units or butylene terephthalate units, while the flexible and long-chain segments comprise, in particular, the reaction product of an aliphatic polyether, for example poly(butylene glycol) or poly(ethylene glycol) with an aliphatic, cycloaliphatic or aromatic dicarboxylic acid. Both the long-chain and the short-chain ester units are often copolyesters which result from the limited co-use of one or more other dicarboxylic acid and glycol components. Thermoplastic polyether-esters, for the preparation of which the titanium dioxide precipitates and titanium dioxide/silicon dioxide and titanium dioxide/zirconium dioxide coprecipitates employed according to the invention as polycondensation catalysts are also suitable, are described, for example, in U.S. Pat. No. 3,023,192, GB-B 682866, DE-C 2352584, EP-A-0051220 and EP-A-0109123, which are incorporated herein by reference in their entirety.

The titanium dioxide precipitates and titanium dioxide/silicon dioxide and titanium dioxide/zirconium dioxide coprecipitates used according to the invention are also suitable for the preparation of completely aromatic or liquid-crystalline polyesters if this is carried out on the basis of customary polycondensation catalysts, such as $Sb_2O_3$ and titanium alkoxides. Thus, for example, completely aromatic polyesters of 10–90 mol per cent of a hydroxy-naphthalenecarboxylic acid, 5–45 mol per cent of at least one other aromatic dicarboxylic acid, for example terephthalic acid, and 5–45 mol per cent of at least one aromatic diol, for example hydroquinone, are known from U.S. Pat. No. 4,421,908 which is incorporated herein in its entirety. According to EP-A-0472366, which is incorporated herein in it its entirety, completely aromatic polyesters are prepared from (A) isophthalic acid, (B) hydroquinone and (C) from 4,4-dihydroxybiphenyl and/or p-hydroxybenzoic acid and/or 2-hydroxy-6-naphthalenecarboxylic acid and (D) a phenol. And EP-A-496,404, which is incorporated herein in its entirety, describes completely aromatic polyesters which are obtained by reaction of at least one dialkyl ester of an aromatic dicarboxylic acid, for example DMT, with at least one aromatic polycarbonate, for example poly(4,4'-isopropylidene-diphenylene carbonate) and/or an aromatic dialkyl dicarbonate. In these processes, mentioned by way of example, for the preparation of completely aromatic polyesters, the polycondensation catalysts used therein, such as $Sb_2O_3$, titanium alkoxides and zirconium alkoxides, can be replaced in an advantageous manner by the specific precipitates and coprecipitates according to the invention, quite irrespective of whether they are added as early as in the first reaction stage or in the subsequent actual polycondensation stage.

The invention is illustrated in more detail with the aid of the following examples. The relative solution viscosity stated therein was measured at 25° C. as a 1% strength solution in m-cresol. The number of carboxyl groups has been stated as carboxyl group equivalents/106 g or mmol/kg of the polymer. This parameter was determined by titration of the polymer in o-cresol with potassium hydroxide.

The L* a* b* color system was taken as the basis for evaluation of the color of the polyesters. This is one of the color systems for standardization of color measurement and was recommended in 1976 by the CIE (Commission Internationale de l'Eclairage) because of its relatively high accuracy in describing perceptible colors and color differences. In this system, L* is the lightness factor and a* and b* are color measurement numbers. In the present case, the b* value, which indicates the yellow/blue balance, is important. A positive b* value means yellow discoloration and a negative b* value blue discoloration. Polyesters prepared conventionally with antimony trioxide have a b* value of between 3 and 8. Higher values are also accepted for products for which color is not critical.

The invention will be further illustrated with reference to the following specific examples. It is understood that these examples are given by way of illustration and are not meant to limit the disclosure or the claims to follow.

A

Preparation of the $TiO_2$ precipitates and $TiO_2/SiO_2$ and $TiO_2/ZrO_2$ coprecipitates

EXAMPLE 1

Catalytically active titanium dioxide precipitate No. 1

10.80 g of titanium(IV) tetraisopropylate (38 mmol) are dissolved in 263 ml of absolute ethanol (solution A). 27.02 g of distilled water (1.5 mol) are mixed with 263 g of absolute ethanol (solution B). Solution A is initially introduced into the reaction vessel and solution B is added dropwise at 22° C. in the course of 30 minutes. A white precipitate separates out. The mixture is centrifuged three times for 20 minutes and the residue is rinsed once with distilled water and once with ethanol. The resulting titanium dioxide precipitate is dried at 65° C. in vacuo. The obtained precipitate finally had a water content of 4.4 weight percent based upon the hydrated precipitate, as determined by Karl Fischer titration.

EXAMPLE 2

Catalytically active titanium dioxide precipitate No. 2

27.02 g of distilled water (1.5 mol), if appropriate mixed with 263 g of absolute ethanol, are added dropwise to 10.80 g of titanium(IV) tetraisopropylate (38 mmol) in the course of 30 minutes. A white precipitate separates out. The mixture is centrifuged three times for 20 minutes and the residue is rinsed once with distilled water and once with ethanol. The resulting titanium dioxide precipitate is dried at 65° C. in vacuo. The obtained precipitate finally had a water content of 3.2 weight percent based upon the hydrated precipitate, as determined by Karl Fischer titration.

EXAMPLE 3

Catalytically active titanium dioxide precipitate No. 3

80 Ml/hour of nitrogen, saturated with water via a wash bottle, are passed into 10.80 g of titanium(IV) tetraisopropylate (38 mmol) for 24 hours. A white precipitate separates out. The mixture is centrifuged three times for 20 minutes and the residue is rinsed once with distilled water and once with ethanol. The resulting titanium dioxide precipitate is dried at 65° C. in vacuo. The obtained precipitate finally had a water content of 4.1 weight percent based upon the hydrated precipitate, as determined by Karl Fischer titration.

EXAMPLE 4

Catalytically active titanium dioxide precipitate No. 4

150 ml of glycol (water content about 0.02% by weight) are added to 10.80 g of titanium(IV) tetraisopropylate (38 mmol). In addition, 80 l/hour (s.t.p.) of nitrogen, saturated with water via a wash bottle, are passed in for a period of 60 minutes. A white precipitate separates out. The titanium dioxide precipitate dispersion formed is employed without further processing.

EXAMPLE 5

Catalytically active titanium dioxide precipitate No. 5

34.04 g of titanium(IV) tetrabutylate (0.1 mol) are heated to about 120° C. together with 62.07 g of glycol (1.0 mol). 32.4 g of dibutylamine (0.25 mol) are added dropwise at this temperature as a transesterification catalyst. The butanol formed is distilled off overnight, while stirring. The residue of the titanium alcoholate formed from glycol is precipitated by means of water containing hydrochloric acid (pH=3), a white precipitate separating out. The mixture is centrifuged three times for 20 minutes and the residue is rinsed once with distilled water and once with ethanol. The resulting titanium dioxide precipitate is dried at 65° C. in vacuo. After drying, it had a water content of 4.6 weight percent based upon the hydrated precipitate, as determined by Karl Fischer titration.

EXAMPLE 6

Catalytically active titanium dioxide precipitate No. 6

34.04 g of titanium(IV) tetrabutylate (0.1 mol) are heated to about 120° C. together with 92.09 g of glycerol (1.0 mol). 32.4 g of dibutylamine (0.25 mol) are added dropwise at this temperature as a transesterification catalyst. The butanol formed is distilled off overnight, while stirring. The residue of the titanium alcoholate formed from glycerol is precipitated by means of water containing hydrochloric acid (pH=3), a brownish precipitate separating out. The mixture is centrifuged three times for 20 minutes and the residue is mixed once with distilled water and once with ethanol. The resulting titanium dioxide precipitate is dried at 65° C. in vacuo. Its water content was finally 4.9 weight percent based upon the hydrated precipitate, as determined by Karl Fischer titration.

EXAMPLE 7

Catalytically active titanium dioxide/silicon dioxide coprecipitate ($TiO_2:SiO_2=95:5$ mol/mol)

11.37 g of titanium(IV) tetraisopropylate (40 mmol) and 0.44 g of tetraethoxysilane (2.1 mmol) are dissolved with 100 ml of absolute ethanol (solution A). 10.27 g of distilled $H_2O$ (0.57 mol) are mixed with 100 ml of absolute ethanol (solution B). Solution A is initially introduced into the reaction vessel, and solution B is added dropwise at 22° C. in the course of 30 minutes. A white precipitate separates out. After the mixture has been stirred for 1 hour, it is centrifuged and the residue is washed 3 times with distilled $H_2O$. The resulting $TiO_2/SiO_2$ coprecipitate is dried at 70° C. in vacuo. Its water content was finally 3.0 weight percent based upon the hydrated coprecipitate, as determined by Karl Fischer titration.

EXAMPLE 8

Catalytically active titanium dioxide/zirconium dioxide coprecipitate ($TiO_2:ZrO_2=97:3$ mol/mol)

25.58 g of titanium(IV) tetraisopropylate (90.0 mmol) and 0.92 g of zirconium(IV) tetrapropylate (2.8 mmol) are dissolved in 263 g of absolute ethanol (solution A). 27.02 g of distilled $H_2O$ (1.5 mol) are mixed with 263 g of absolute ethanol (solution B). Solution A is initially introduced into the reaction vessel, and solution B is added dropwise at 22° C. in the course of 30 minutes. A white precipitate separates out. After the mixture has been stirred for 1 hour, it is centrifuged. The residue is washed once with distilled $H_2O$ and then washed with ethanol and centrifuged for in each case 20 minutes. The resulting $TiO_2/ZrO_2$ coprecipitate is dried at 60°–70° C. in vacuo for 24 hours. Its water content was finally 4.1 weight percent based upon the hydrated coprecipitate, as determined by Karl Fischer titration.

B

Polycondensation Examples

EXAMPLE 9 a) Polyethylene terephthalate was prepared in a two-stage process. In the first stage, the transesterification, the reaction of ethylene glycol and dimethyl terephthalate (=DMT) in a molar ratio of 2.5:1 was carried out in the presence of 100 ppm of $ZnAc_2.2\ H_2O$ (Ac=acetate) and 150 ppm of $MnAc_2.4\ H_2O$, based on the DMT, at temperatures in the range from 165° to 265° C., the continuous increase in temperature from 165° C. to 265° C. being carried out not too quickly in order to avoid sublimation of the DMT. The methanol liberated during the transesterification is distilled off over a column. When the reaction temperature had reached 240° C., 50 ppm of phosphorus, based on the DMT employed, were added as ethyl phosphonoacetate in order to block the transesterification catalysts.

As soon as the reaction temperature of 250° C. was reached, 100 ppm, based on the bis-(2-hydroxyethyl) terephthalate present, of the titanium dioxide precipitate prepared according to Example 1 were added in the form of a 5% strength by weight suspension in glycol. The polycondensation reaction was carried out at 290° C. under a vacuum of 1.3 mbar. After a reaction time of 96 minutes, a polymer having a relative solution viscosity of 1.665 was obtained. The b* value was 9.0 and the COOH end group content was 18.3 equivalents/106 g of polymer.

b) The titanium dioxide precipitate according to Example 1 was stored for 1.5 years and Example 9a was repeated. There were obtained substantially the same results, that is, the catalyst had not lost its catalytic activity.

c) A titanium dioxide precipitate according to Example 1, with the modification that its water content through shorter drying was 17.5 weight percent based upon the hydrated precipitate, was stored for six months, and Example 9a was repeated. The polycondensation time increased up to 145 minutes although the fresh catalyst showed the same short polycondensation time as in Example 9a.

EXAMPLE 10

Polyethylene terephthalate was prepared in a two-stage process. In the first stage, the transesterification, the reaction of ethylene glycol and dimethyl terephthalate was carried out in the presence of 55 ppm of MnAc$_2$.4 H$_2$O or 75 ppm of MnAc$_2$.2 H$_2$O based on the DMT, in a manner otherwise the same as in Example 7. However, the transesterification catalysts were blocked with an equivalent amount of phosphorous acid, which was added in the form of a 70% strength by weight solution in glycol.

At 250° C., 100 ppm. based on the bis-(2-hydroxyethyl) terephthalate present, of the titanium dioxide precipitate prepared according to Example 3 were added in the form of a 5% strength by weight suspension in glycol. The polycondensation reaction was carried out at 283° C. under a vacuum of 0.8 mbar. After a reaction time of 88 minutes, a polymer having a relative solution viscosity of 1.654 was obtained. The b* value was 7.5 and the COOH end group content was 19.3 equivalents/106 g of polymer.

EXAMPLE 11

Example 9 was repeated, with the modification that at 250° C. 100 ppm. based on the bis-(2-hydroxyethyl) terephthalate present, of the titanium dioxide precipitate prepared according to Example 4 were added in the form of a 5% strength by weight suspension in glycol. The polycondensation reaction was carried out at 276° C. under a vacuum of 0.5 mbar. After a reaction time of 82 minutes, a polymer having a relative solution viscosity of 1.614 was obtained. The b* value was 7.5 and the COOH end group content was 20.1 equivalents/106 g of polymer.

EXAMPLE 12

Example 9 was repeated, with the modification that at 250° C. 100 ppm. based on the bis-(2-hydroxyethyl) terephthalate present, of the titanium dioxide precipitate prepared according to Example 2 were added in the form of a 5% strength by weight suspension. The polycondensation reaction was carried out at 290° C. under a vacuum of 1.3 mbar. After a reaction time of 98 minutes, a polymer having a relative solution viscosity of 1.653 was obtained. The b* value was 6.5 and the COOH end group content was 14.8 equivalents/106 g of polymer.

EXAMPLE 13

Example 9 was repeated, with the modification that at 250° C. 100 ppm. based on the bis-(2-hydroxyethyl) terephthalate present, of the titanium dioxide precipitate prepared according to Example 5 were added in the form of a 5% strength by weight suspension. The polycondensation reaction was carried out at 290° C. under a vacuum of 1.3 mbar. After a reaction time of 101 minutes, a polymer having a relative solution viscosity of 1.635 was obtained. The b* value was 8.2 and the COOH end group content was 17.6 equivalents/106 g of polymer.

EXAMPLE 14

Example 9 was repeated, with the modification that at 250° C. 100 ppm. based on the bis-(2-hydroxyethyl) terephthalate present, of the titanium dioxide precipitate prepared according to Example 6 were added in the form of a 5% strength by weight suspension. The polycondensation reaction was carried out at 290° C. under a vacuum of 1.3 mbar. After a reaction time of 92 minutes, a polymer having a relative solution viscosity of 1.634 was obtained. The b* value was 10.4 and the COOH end group content was 17.7 equivalents/106 g of polymer.

EXAMPLE 15

Example 9 was repeated, with the modification that at 250° C. 100 ppm. based on the bis-(2-hydroxyethyl) terephthalate present, of the titanium dioxide/zirconium dioxide coprecipitate having the composition TiO$_2$:ZrO$_2$=97:3 mol/mol prepared according to Example 8 were added in the form of a 5% strength by weight suspension in glycol. The polycondensation reaction was carried out at 290° C. under a vacuum of 1.3 mbar. After a reaction time of 80 minutes, a polymer having a relative solution viscosity of 1.634 was obtained. The b* value was 7.3 and the COOH end group content was 16.9 equivalents/106 g of polymer.

EXAMPLE 16

Example 9 was repeated, with the modification that at 250° C. 100 ppm. based on the bis-(2-hydroxyethyl) terephthalate present, of the titanium dioxide/silicon dioxide coprecipitate having the composition of TiO$_2$:SiO$_2$=95:5 mol/mol prepared according to Example 7 were added in the form of a 5% strength by weight suspension in glycol. The polycondensation reaction was carried out at 290° C. under a vacuum of 1.3 bar. After a reaction time of 97 minutes, a polymer having a relative solution viscosity of 1.646 was obtained. The b* value was 9.2 and the COOH end group content was 17.5 equivalents/106 g of polymer.

EXAMPLE 17

Polyethylene terephthalate was prepared in a two-stage process, a direct esterification of terephthalic acid with ethylene glycol to give bis-(2-hydroxyethyl) terephthalate being carried out in the first stage. In the second reaction stage, the polycondensation was carried out using a) 400 ppm of Sb$_2$O$_3$, b) 100 ppm of TiO$_2$/SiO$_2$ (95:5 mol/mol) and c) TiO$_2$/ZrO$_2$ (97:3 mol/mol) as polycondensation catalysts.

a) Sb$_2$O$_3$ as the polycondensation catalyst 1707 g (10.3 mol) of terephthalic acid are heated up in the esterification autoclave together with 1020 g of glycol (16.4 mol) and 1 ppm of defoamer M10 (from Dow Corning) until an increased pressure of 7 bar has been established by the water split off (235° C. batch temperature). The time this pressure is reached is evaluated as the starting time of the reaction. The increased pressure is maintained for 60 minutes, during which the internal temperature is increased to about 250° C. The water vapor thereby discharged is condensed in the condenser and collected in a measuring cylinder. After a total of 60 minutes, the internal pressure is reduced stepwise to normal pressure in the course of a further 60 minutes (temperature between 250° and 260° C.). The product is then drained into the polycondensation autoclave. Immediately after draining, 50 ppm of phosphorus are added as ethyl phosphonoacetate (EPA) at 240° C. 400 ppm of Sb$_2$O$_3$, based on the bis-(2-hydroxyethyl) terephthalate present, are then added in the form of a 1.1% strength solution in glycol at an internal temperature of 250° C. (after about 5 minutes). A vacuum program which reduces the internal pressure to about 1 torr in the course of 25 minutes is then started, with further heating. The internal temperature is regulated by the peak procedure (peak temperature: 298° C.). The reaction end point is determined by measuring the power consumption of the stirrer. After 95 minutes, a product having a solution viscosity of 1.681 is obtained. The carboxyl end group content was 20.1 mmol/kg.

b) TiO$_2$/SiO$_2$ (95:5 mol/mol) as the polycondensation catalyst

Example 17a) was repeated, with the modification that at 250° C. 100 ppm of TiO$_2$/SiO$_2$ (95:5 mol/mol), based on the bis-(2-hydroxyethyl) terephthalate present, were added as the polycondensation catalyst in the form of a 5% strength dispersion in glycol. After 94 minutes, a product having a solution viscosity of 1.669 is obtained. The carboxyl end group content was 12.2 mmol/kg, and is thus significantly better than in experiment 17a).

c) $TiO_2/ZrO_2$ (97:3 mol/mol) as the polycondensation catalyst

Example 17a) was repeated, with the modification that at 250° C. 50 ppm of $TiO_2/ZrO_2$ (97:3 mol/mol), based on the bis-(2-hydroxyethyl) terephthalate present, were added as the polycondensation catalyst in the form of a 5% strength dispersion in glycol. After 84 minutes, a product having a solution viscosity of 1.682 is obtained. The carboxyl end group content was 13.4 mmol/kg, and is thus likewise more favorable than in experiment 17a).

EXAMPLE 18

Post-condensation in the solid phase a) Polycondensation catalyst $Sb_2O_3$

About 2 g of polyethylene terephthalate having a relative solution viscosity (SV) of 1.681 and a carboxyl end group concentration of 20.1 mmol/kg, prepared using 400 ppm of $Sb_2O_3$ as the polycondensation catalyst in accordance with Example 17a), are introduced into a glass tube immersed in a metal bath. Under a continuous stream of nitrogen, the polymer is first kept at 140° C. for one hour (pre-crystallization) and then kept at 231° C. for a further 4 hours. After the post-condensation, the SV was 1.880 and the carboxyl end group content was 11.0 mmol/kg.

b) Polycondensation catalyst $TiO_2$ precipitate

About 2 g of polyethylene terephthalate having a relative solution viscosity (SV) of 1.654 and a carboxyl end group content of 19.3 mmol/kg, prepared using 100 ppm of $TiO_2$ precipitate as the polycondensation catalyst in accordance with Example 9, are introduced into a glass tube immersed in a metal bath. Under a continuous nitrogen atom, the polymer is first kept at 140° C. for one hour (pre-crystallization) and then kept at 231° C. for a further 4 hours. After the post-condensation, the SV was 1.982 and the carboxyl end group content was 10.6 mmol/kg.

EXAMPLE 19

Preparation of a malonate resin a) Catalyst: dibutyl-tin oxide

A 2000 ml five-necked flask which was equipped with a metal stirrer, dropping funnel, nitrogen inlet tube, thermocouple for the internal temperature, a 300 mm long Vigreux silver-jacketed column and a distillation column head was used as the apparatus for this example. The reaction batch comprised the following components:

312.45 g (3 mol) of pentane-1,5-diol as component A, 560.60 g (3.5 mol) of diethyl malonate as component B, 0.87 g (=0.1% by weight, based on A+B) of dibutyl-tin oxide as component C, 43.5 g (15% by weight, based on A+B) of m-xylene as component D, 130.5 g (15% by weight, based on A+B) of xylene as component E.

The dibutyl-tin oxide customary for this reaction was used as the catalyst. Components A, B, C and D were weighed into a flask and the flask was flushed with nitrogen. The mixture was then heated slowly and the first drops of ethanol were distilled off at an internal temperature of 115° C. At a falling rate of distillation, the internal temperature was increased to 200° C. Component E was then additionally added dropwise as an entraining agent for the distillation and removal of the ethanol/m-xylene distillate continued. When the conversion had reached 99.5%, the polycondensation was interrupted. This conversion was achieved after 16 hours.

The total amount of distillate at this point in time was 378.03 g. The amount of ethanol distilled off was 274.92 g (theoretical total amount =276.42 g). The Gardner color number was 13.

b) Catalyst: $TiO_2$ precipitate

The experiment under a) was repeated with the catalyst according to the invention. The reaction batch comprised the following components:

312.45 g (3 mol) of pentane-1,5-diol as component A, 560.60 g (3.5 mol) of diethyl malonate as component B, 0.87g (0.1% by weight, based on A+B) of $TiO_2$ precipitate as component C as in Example 3, 43.5g (5% by weight, based on A+B) of m-xylene as component D, 87.0 g (10% by weight, based on A+B) of n-xylene as component E.

Components A, B, C and D were weighed into the flask and the flask was flushed with nitrogen. The mixture was then heated slowly and the first drops of ethanol were distilled off as a mixture with m-xylene at an internal temperature of 142° C. At a falling rate of distillation, the internal temperature was increased to 200° C. Component E was then additionally added dropwise as an entraining agent for the distillation and removal of the ethanol/m-xylene distillate continued. When the conversion reached 99.8%, the polycondensation was discontinued. This conversion was reached after only 6 hours.

The total amount of distillate at this point in time was 342.28 g. The amount of ethanol distilled off was 276.04 g (theoretical total amount of ethanol =276.42 g). The Gardner color number was 10.

C

COMPARISON EXAMPLES

COMPARISON EXAMPLES 1a and 1b a) An attempt was made to prepare a polyethylene terephthalate analogously to Example 7, in which commercially available titanium dioxides were to function as polycondensation catalysts.

For this purpose, after the transesterification carried out in accordance with Example 7 and after blocking of the transesterification catalysts when the reaction temperature reached 250° C., 500 ppm of Hombitec KO 3 $TiO_2$ (a titanium dioxide from Sachtleben), based on the bis-(2-hydroxyethyl) terephthalate present, were added to the reaction batch as the polycondensation catalyst in the form of a 10% strength by weight suspension in glycol. The polycondensation reaction was carried out at 290° C. under a vacuum of 1.3 mbar. After a reaction time of 180 minutes, the experiment was discontinued, since no adequate melt viscosity and therefore no adequate relative viscosity either had been established because the molecular weight of the polycondensation product was too low.

b) A second attempt carried out under the same reaction conditions, in which 500 ppm of Tilcom HPT 3 $TiO_2$ (titanium dioxide from Tioxide), based on the bis-(2- hydroxyethyl) terephthalate present, were added as the polycondensation catalyst in the form of a 10% strength by weight suspension in glycol, proceeded with the same negative result.

COMPARISON EXAMPLE 2

Example 8 was repeated with the modification that at 250° C., 340 ppm of $Sb_2O_3$, based on the bis-(2-hydroxyethyl) terephthalate present, were added. The polycondensation reaction was thus carried out at 283° C. under a vacuum of 0.8 mbar. After a reaction time of 180 minutes, a polymer having a relative solution viscosity of 1.590 was obtained. The b* value was 4.8 and the COOH end group content was 22.5 equivalents/106 g of polymer.

This comparison example shows in particular that the catalytic activity of the catalysts used according to the invention is considerably higher than that of $Sb_2O_3$, and with the former it is therefore possible to achieve the same polycondensation times as when $Sb_2O_3$ is used by considerably reducing the amount of catalyst employed, and—if the color values of the thread-forming polyesters are important for certain uses—also to achieve practically the same b* values (Examples 7, 8, and 9).

COMPARISON EXAMPLE 3

Example 7 was repeated with the modification that at 250° C., 213 ppm of titanium tetrabutylate, based on the bis-(2-hydroxyethyl) terephthalate present, were added as the polycondensation catalyst in the form of a 5% strength by weight solution in glycol. The polycondensation reaction was carried out at 290° C. under a vacuum of 3.5 mbar. After a reaction time of 134 minutes, a polymer having a relative solution viscosity of 1.633 was obtained. The b* value was 15.5 and the COOH end group content was 20.2 equivalents/106 g of polymer.

This comparison example shows in particular that, although titanium tetrabutylate has a higher catalytic activity than $Sb_2O_3$ at a significantly poorer b* value, it has to be employed in a higher concentration than the catalysts used according to the invention to achieve comparably short polycondensation times.

While the invention has been described with preferred embodiments, it is to be understood that variations and modifications are to be considered within the purview and the scope of the claims appended hereto.

What is claimed is:

1. A process for the preparation of polyesters and copolyesters comprising the polycondensation of polyester-forming starting components, esters or oligoesters being prepared in a first reaction stage and subjected to polycondensation in a second reaction stage in the presence of titanium catalysts, wherein in the polycondensation stage, at least one of a titanium dioxide precipitate, a titanium dioxide/silicon dioxide coprecipitate having a composition of $TiO_2:SiO_2$ of >90:10 mol/mol and a titanium dioxide/zirconium dioxide coprecipitate having a composition of $TiO_2:ZrO_2$ of >95:5 mol/mol, which have been obtained by hydrolytic precipitation of the corresponding metal alcoholates formed from mono- or polyhydric alcohols, whereby the hydrolytic precipitation is performed by first introducing the metal alcoholate into the precipitation vessel and subsequently slowly adding the medium containing the precipitating agent water, is employed as the polycondensation catalyst for polycondensation of the esters or oligoesters.

2. The process according to claim 1, wherein the titanium dioxide precipitates, titanium dioxide/silicon dioxide coprecipitates, and titanium dioxide/zirconium dioxide coprecipitates which have been obtained by hydrolytic precipitation of the corresponding metal alcoholates formed from monohydric alcohols having 1–6C atoms are employed.

3. The process according to claim 1, wherein at least one of the titanium dioxide precipitate, the titanium dioxide/silicon dioxide coprecipitate, and the titanium dioxide/zirconium dioxide coprecipitate is employed in a total amount of 5–500 ppm, based on the esters or oligoesters to be subjected to polycondensation.

4. The process according to claim 3, wherein at least one of the titanium dioxide precipitate, the titanium dioxide/silicon dioxide coprecipitate, and the titanium dioxide/zirconium dioxide coprecipitate is employed in a total amount of 10 to 100 ppm, based on the esters or oligoesters to be subjected to polycondensation.

5. The process according claim 1, wherein at least one of the titanium dioxide precipitate, the titanium dioxide/silicon dioxide coprecipitate, and the titanium dioxide/zirconium dioxide coprecipitate is employed with a water content of from 0 to about 15 weight percent based upon the hydrated precipitate or coprecipitate.

6. The process according claim 1, wherein at least one of the titanium dioxide precipitate, the titanium dioxide/silicon dioxide coprecipitate, and the titanium dioxide/zirconium dioxide coprecipitate is added in the form of a 5 to 20% strength by weight suspension in glycol to the esters or oligoesters to be subjected to polycondensation before their polycondensation.

7. The process according to claim 1, wherein any transesterification catalysts present from the first reaction stage are blocked by additional addition of one or more phosphorus compounds.

8. The process according to claim 7, wherein carbethoxymethyl-diethyl phosphonate, di(polyoxyethylene)hydroxymethyl phosphonate, tetraisopropyl methylenediphosphonate and/or $H_3PO_4$ are employed as the blocking agent.

9. A method for using of the polycondensation catalysts according to claim 1 for the preparation of alkyd resins having a relative molecular weight of <10,000.

10. A method for using the polycondensation catalysts according to claim 1 for the preparation of saturated polyester resins having a relative molecular weight of <10,000.

11. A method for using the polycondensation catalysts according to claim 1 for the preparation of polyesters and copolyesters as precursors for polyurethanes having a relative molecular weight of <10,000.

12. A method for using the polycondensation catalysts according to claim 1 for the preparation of thermoplastic polyesters and copolyesters having a relative molecular weight of >10,000.

13. A method for using the polycondensation catalysts according to claim 12 for the preparation of polyethylene terephthalate, polybutylene terephthalate, poly(ethylene 2,6-naphthalene-dicarboxylate), poly(butylene 2,6-naphthalene-dicarboxylate), poly(1,4-dimethylenecyclohexane terephthalate) and copolyesters thereof based on high homopolyester contents of at least 80 mol per cent.

14. A method for using the polycondensation catalysts according to claim 12 for the preparation of polyether-esters.

15. A method for using the polycondensation catalysts according to claim 1 for the preparation of completely aromatic or liquid-crystalline polyesters.

* * * * *